United States Patent [19]

Chan

[11] Patent Number: 5,283,558
[45] Date of Patent: Feb. 1, 1994

[54] LOW-COST DEVICES FOR TOUCH CONTROL

[76] Inventor: James K. Chan, 2342 Colt Rd., Rancho Palos Verdes, Calif. 90274

[21] Appl. No.: 826,363

[22] Filed: Jan. 27, 1992

Related U.S. Application Data

[63] Continuation-in-part of Ser. No. 422,151, Oct. 16, 1989, abandoned.

[51] Int. Cl.⁵ .............................................. G09G 3/02
[52] U.S. Cl. ...................................... 345/168; 178/18; 178/19
[58] Field of Search .................. 341/34; 340/712, 706; 178/18, 19; 338/99; 200/512

[56] References Cited

U.S. PATENT DOCUMENTS

| | | | |
|---|---|---|---|
| 3,304,612 | 2/1967 | Proctor | 178/18 |
| 4,214,122 | 7/1980 | Kley | 178/18 |
| 4,492,819 | 1/1985 | Rodgers | 178/18 |
| 4,550,316 | 10/1985 | Whetstore | 340/709 |
| 4,570,149 | 2/1976 | Thornburg | 178/18 |
| 4,582,955 | 4/1986 | Blesser | 178/19 |
| 4,717,793 | 1/1988 | Kobayashi | 178/19 |
| 4,752,655 | 6/1988 | Tajiri | 178/18 |
| 5,120,907 | 6/1992 | Shirbori | 178/18 |

FOREIGN PATENT DOCUMENTS 947980 8/1956 Fed. Rep. of Germany.

Primary Examiner—Richard Hjerpe
Assistant Examiner—Lun-Yi Lao

[57] ABSTRACT

Low-cost devices for touch control by using a matrix of discrete composite switch contacts in close proximity, and x and y terminal measurable parameter such as resistance for touch position sensing and encoding. When a touch position is touched, the corresponding composite switch contacts simultaneously short a proportional portion of the x and y terminal resistance. These terminal resistance values are then converted to digital x and y cordinates of the touched position by A/D converters. Also, that the resistance between the last position sensing conductor and the ground return is three to five times larger than the resistance between all the other position sensing conductors of the first and second sheet eliminates the occasional error of detecting the normally untouched state as a touched state.

3 Claims, 13 Drawing Sheets

LOW-COST DEVICES FOR TOUCH CONTROL

CROSS-REFERENCE TO RELATED APPLICATION

This is a continuation-in-part of a U.S. patent application entitled "Method and Devices for Touch Control" filed Oct. 16, 1989 and assigned Ser. No. 07/422,151, now abandoned.

1. Technical Field

The present invention relates to touch pad/screen, and touch floor mat, and more particularly, to touch pads/screens using the coated membrane technology and terminal resistive coating, and to new touch floor mat.

2. Background Art

Various embodiments using coated membrane technology have been proposed for touch pad. Early embodiment is exemplified by U.S. Pat. No. 3,304,612 issued Feb. 21, 1967 to Proctor et al. Proctor et al discloses two conductive parallel wire sets laid orthogonal to each other. One end of each conductive parallel wires is connected to the resistive network. When force is applied, the x, and y coordinates of position contacted can be determined by sensing the terminal resistance of the x, and y resistve networks. One disadvantage of Proctor et al's invention is that it requires sequential measuring of the x and y terminal resistance with a set of external switches 18 and connect translator 42. Another embodiment using membrane technology is disclosed by Doughly in U.S. Pat. No. 4,471,177. Doughty's invention relates to membrane switch technolgy in which composite switches can be formed using five layer structures, namely top layer 10, spacer layer 34, common layer 12, another spacer layer 36, and bottom layer 24 to simultaneously activate two functions. U.S. Pat. No. 4,570,149 issued to Thornburg et al innovatively combines the idea of Doughly with that of Proctor so that the two x, and y terminal resistance can be measured simultaneously and thus eliminates the need of external switches and connect translator. The resulted touch tablet consists of five layers as in Doughly. These are the top conductive Y-layer 70, spacer layer 85, ground layer 86, spacer layer 87, and X-layer 80. An alternate implementation consists of three layers without the spacer layers, but with a ground metal base as the third layer. The ground layer 86, is between the two sensing layers and can be formed of an insulating layer on which two conductive surfaces, one to be contacted by the conductive strips of the top Y-layer 70, and the other to be contacted by conductive strips of the bottom X-layer 80. Alternatively, this separate ground layer can be a solid sheet of metal providing ground return for both sensing layers. One of the undersirable characteristics of Thornburg et al's invention is that it is not very touch sensitive since all the layers have to come to contact. Intermitent results may occur when some layers come in contact first before the other layers. In addtition, this implementation is expensive to manufacture especially for large touch area since five membrane layers and external connection between one end of the resistve ink strips 72 and 82 and the ground layer 86 or 96 are required for implementation. Another disadvantage is that with equal spaced conductive strips 73, the difference between the normally untouched condition and the touched condition of the last sensing coordinates of the touch pad is very difficult to distinguish due to the tolerances in printing the resistive ink and the A/D conversion noise. Still another disadvantage is that gound metal plane or the groung conductive layer is opague and thus the invention by Thornburg et al is for touch pad only. It cannot be used in touch screen applications.

Another class of touch tablet or coordinate digitizer employs a stylus for position sensing. Most of the sensing techniques depends on electrostatic or electromagnetic field pick up by the stylus as exemplified by U.S. Pat. No. 3,886,311 issued to Rodgers et al, and by U.S. Pat. No. 4,717,793 issued to Kobayashi. This type requires complex analog and/or digital electronic circuits in the tablet itself and in the sensing stylus. The advantages of this type of coordinate sensing devices are that sensing resolution can be made finer than the spacing between the pulse-carrying metal wires and the stylus does not need to be in contact with the metal wires at all. Therefore, they are high cost, but high resolution position sensing devices. Recently, U.S. Pat. No. 4,654,479 issued to Wong et al in Mar. 31, 1987 shows a digtital electronic means of entering and transfering Chinese character images within a set matrix. A conductive stylus 26 which carries a ground is used to latched up the touched dot of a dot matrix. After all dots in a script have been latched, a complicated electronic sequence is required -to transmit the digital information to the computer. This stylus is employed to close a single switch to a latch at a time, and the latch position is scanned by digital read out. The undesirable characteristics of Wong et al's invention are that the registration and sensing are two separate steps and very complex digtital electronics is required. The complexity goes up as the size of the matrix increases, and therefore only good for small size pattern. Thus, the prior stylus-type of position entry control devices are not suitable for low-cost implementation.

It should also be pointed out that these prior arts are for digitizer or touch tablet and none of them are related to floor mat.

DISCLOSURE OF INVENTION

It is an object of the present invention to provide an inexpensive control device which can be used as either a touch pad or a touch screen.

Another objective of the present invention is to provide an inexpensive control device for use as a large area touch floor mat.

Still another objective of the present invention is to provide an inexpensive stylus-type position entry control device.

The present invention eliminates all the undesirable characteristics of Thornburg et al and other prior arts by employing an innovative distributed ground network for a touch tablet/screen. The prsent invention also makes a low-cost large-area but low resolution touch floor mat practical. The present invention also significantly reduces the cost of a stylus-type tablet by the innovative mobile ground return stylus. The resulted touch pad or touch screen has only three layers including the spacer layer or two layers without a physical spacer layer.

Briefly, a control device, according to this invention, includes: a unique matrix-switch and resistance sening combination for x and y coordinates detection and encoding. In particular, each switch in the matrix-switch panel is a composite switch consisting of two switch contacts. These two switch contacts can be either adjacent to each other in close proximity as in the distributed ground method or in cascade vertically as in the mobile ground contact implementation. One switch contact is for shorting the x and y touch conductors together while the second switch contact shorts the touch position to a common ground and thus changing the terminal resistance of both the x and y outputs. The x and the y terminal resistance are connected across all parallel vertical or horizontal sensing conductors respectively at the edges of the matrix-switch. Since the terminal resistance value changes in discrete steps coresponding to the discrete switch being touched, its sensitivity is limited by the A/D conversion process only. Because of this unique matrix-switch and terminal resistance combination, the x and y coordinates detection and encoding can be accomplished without the complex electronics as in the conventional single discrete matrix-switch touch control device. Using the membrane switch manufacturing technique, this invention leads low cost and reliable touch pads/screens for the consumer market.

This invention can be implemented with transparent membranes with very fine-line conductor mesh or transparent low-resisitive coating. Also, the edge terminal resistance can be placed easily out of the field of the view of the screen. Thus, this invention can also function as a very inexpensive touch screen. For the new application as touch floor mat, sensing wires and discrete resistors are used.

A variation to the above invention is to provide a mobile ground return path structure for the touched x and y conductors instead of the distributed fix ground return path. This mobile ground return path is accomplished by using a conductive tip blunt stylus or the conductive protrusion in the case of the electronic mouse. Another embodiment is for low-cost and reliable large touch floor mat where wire mesh and discrete resistors are employed.

In these embodiments, the terminal resistance of the normally untouched state is much bigger than any incremental change in terminal resisitance in any touched state, and thus the touched and the normally untouched state can be easily detected, and determined with great certainty. This structural feature can reduce the manufacturing tolerances such as the resistive ink printing tolerances and can toleraste the conversion noise of a low-cost A/D converter.

As will become apparent, control devices incorporating the invention are, relative to present touch pads/screens, or touch floor mats inexpensive to manufacture.

BRIEF DESCRIPTION OF THE DRAWINGS

For a better understanding of the invention reference should be made to the accompanying drawings wherein.

BEST MODES FOR CARRYING OUT THE INVENTION

Figure 5A:
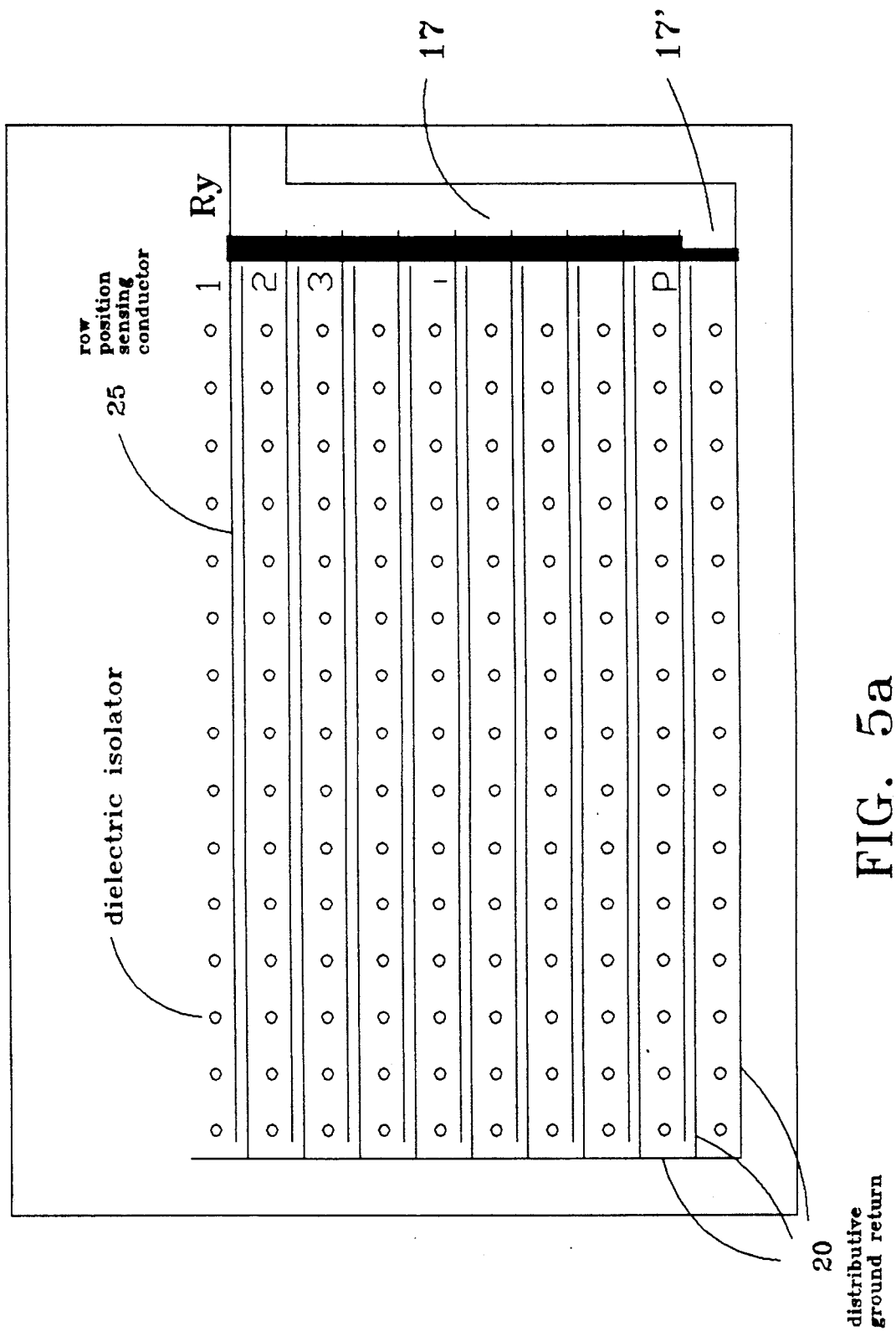
FIG. 5a–5b shows the layers similar to FIG. 3a and 3c except with the distributed ground and spacer dots coated on the row sensiting layer.
Figure 5B:
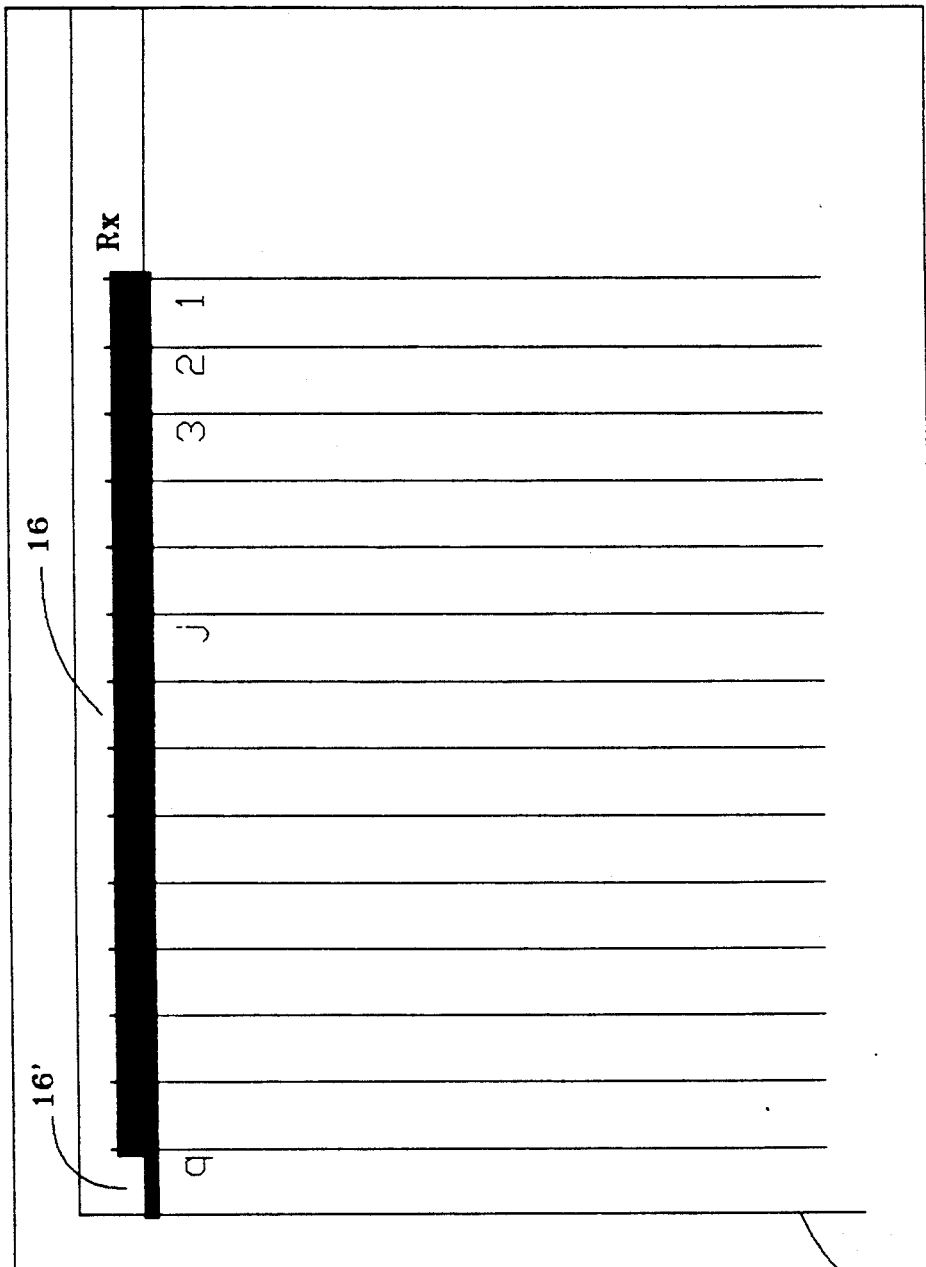
Figure 6:
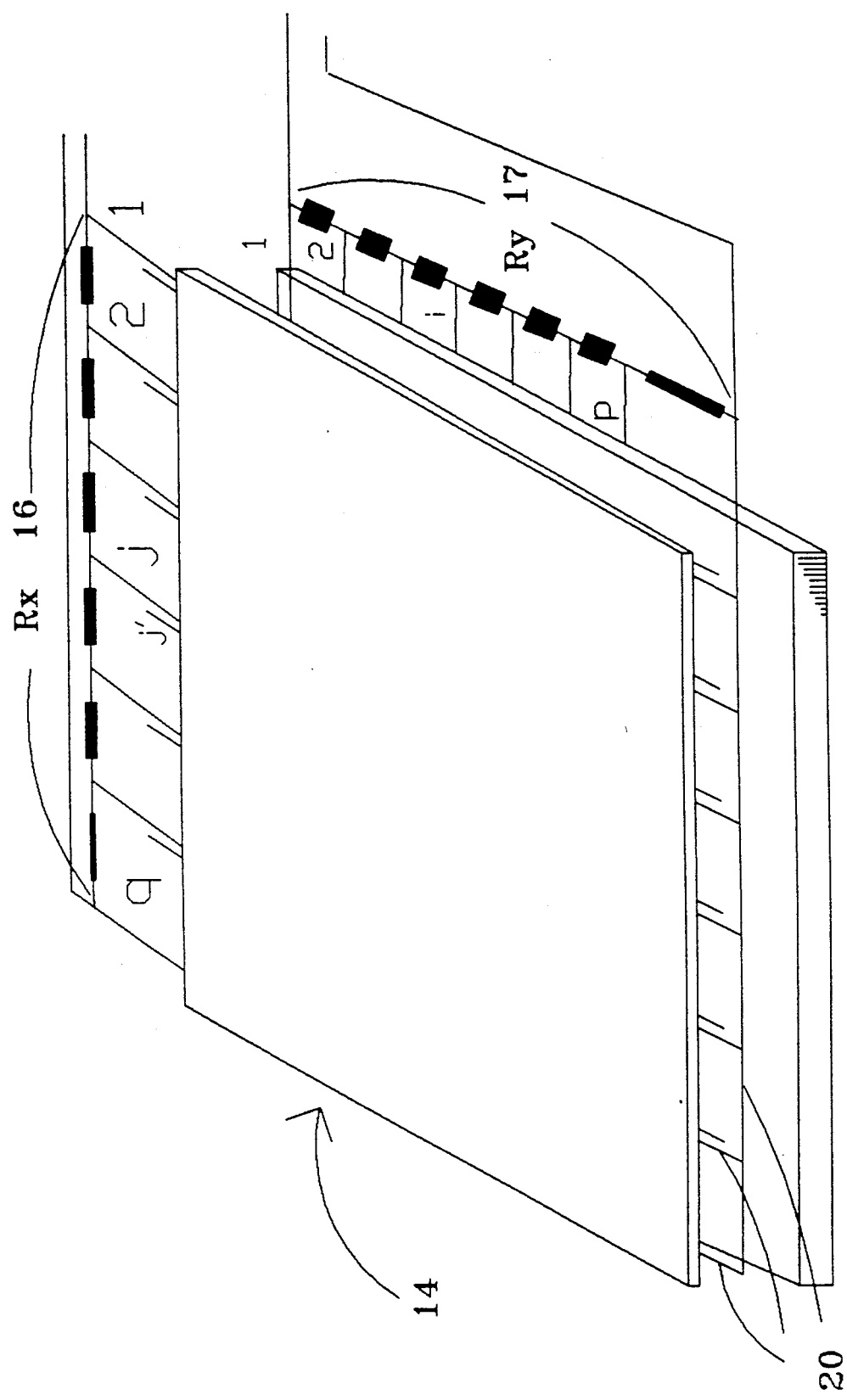
FIG. 6 is the perspective view of the control device, according to the invention as a touch floor mat.
Figure 7:
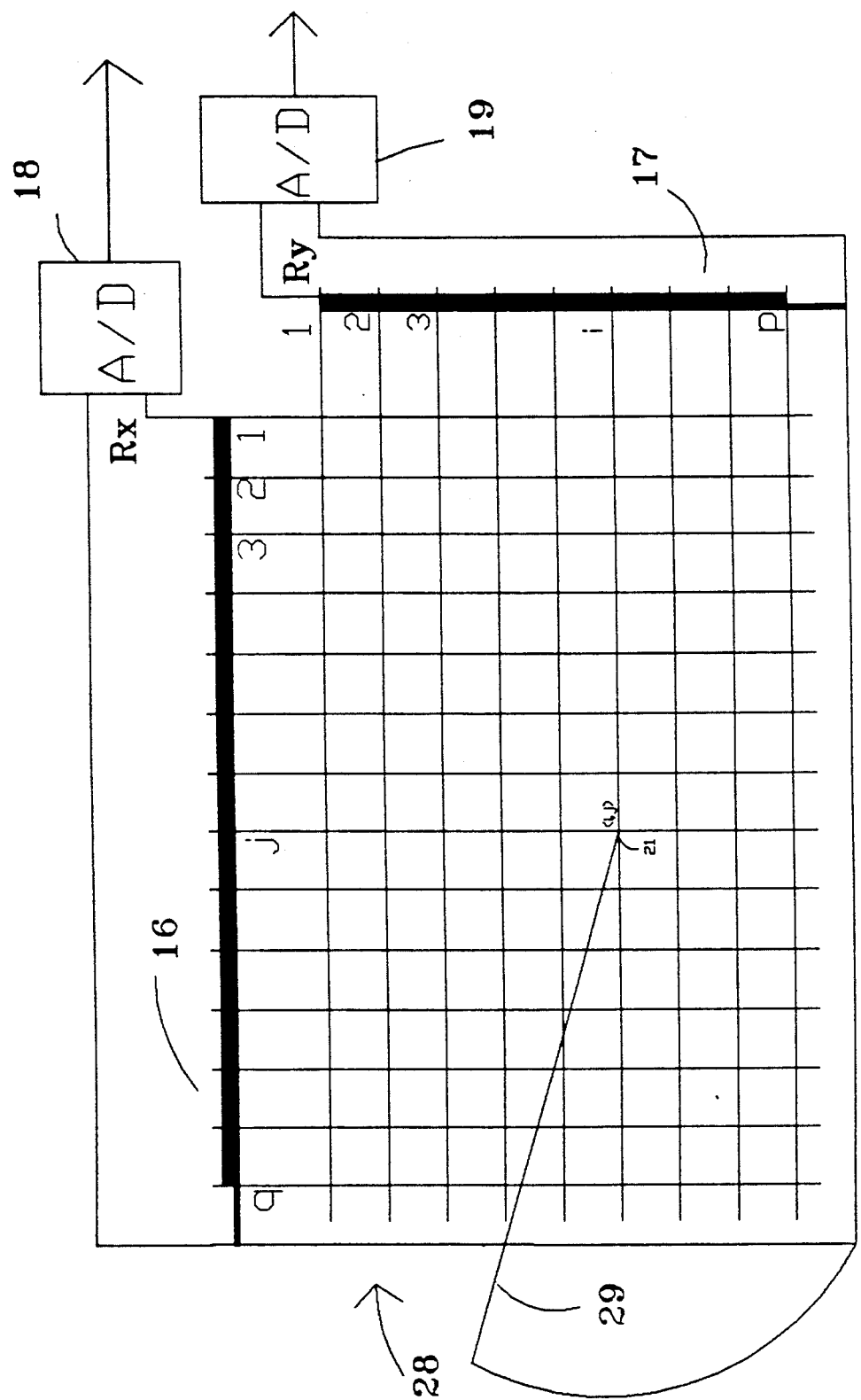
FIG. 7 is a schematic view of another control device using mobile ground return, according to the invention.
Figure 8:
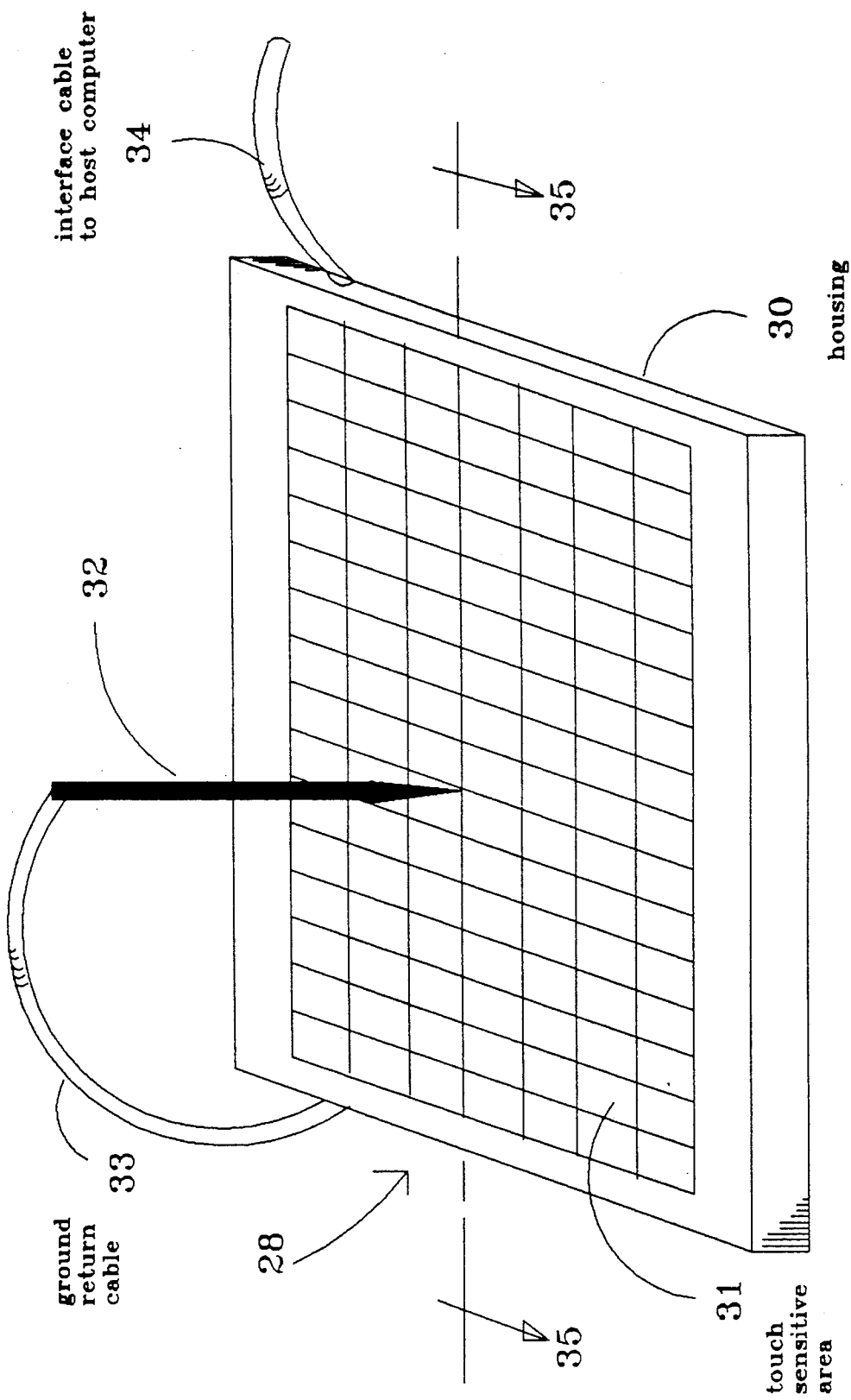
FIG. 8 is a perspective view of the control device shown schematically in FIG. 7 with a stylus as the mobile ground return structure as well as the pointing device.
Figure 9:
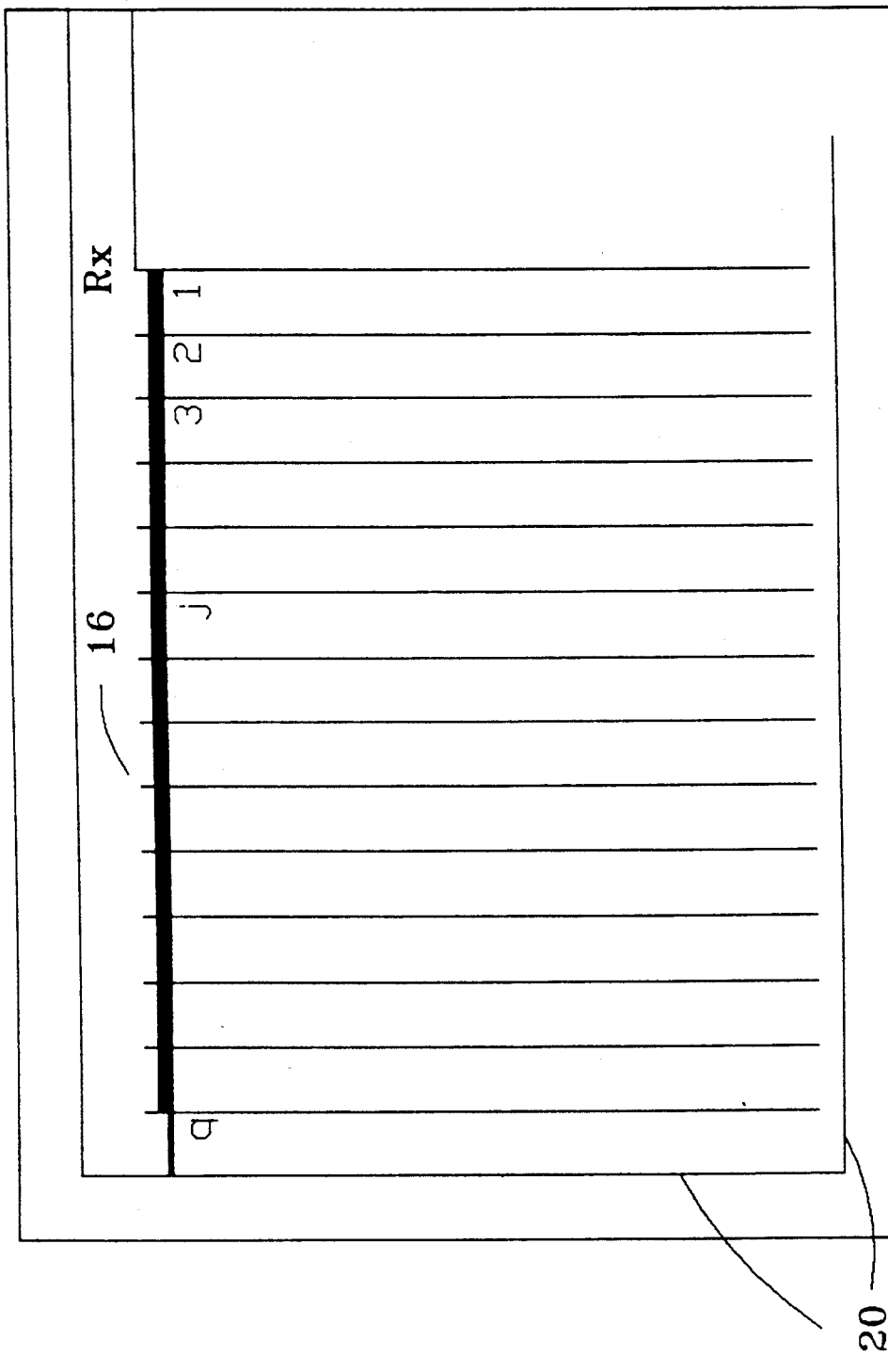
FIG. 9 shows the third or bottom layer of the control device shown in FIG. 8.

A control device 14 embodying the invention as a touch pad, a touch screen or a touch floor mat is shown in FIGS. 1, 2, 3, 4, 5 and 6. Another control device 28 embodying a variation to the invention for the new application as a touch floor mat is shown in FIGS. 7, 8 and 9.

Figure 1:
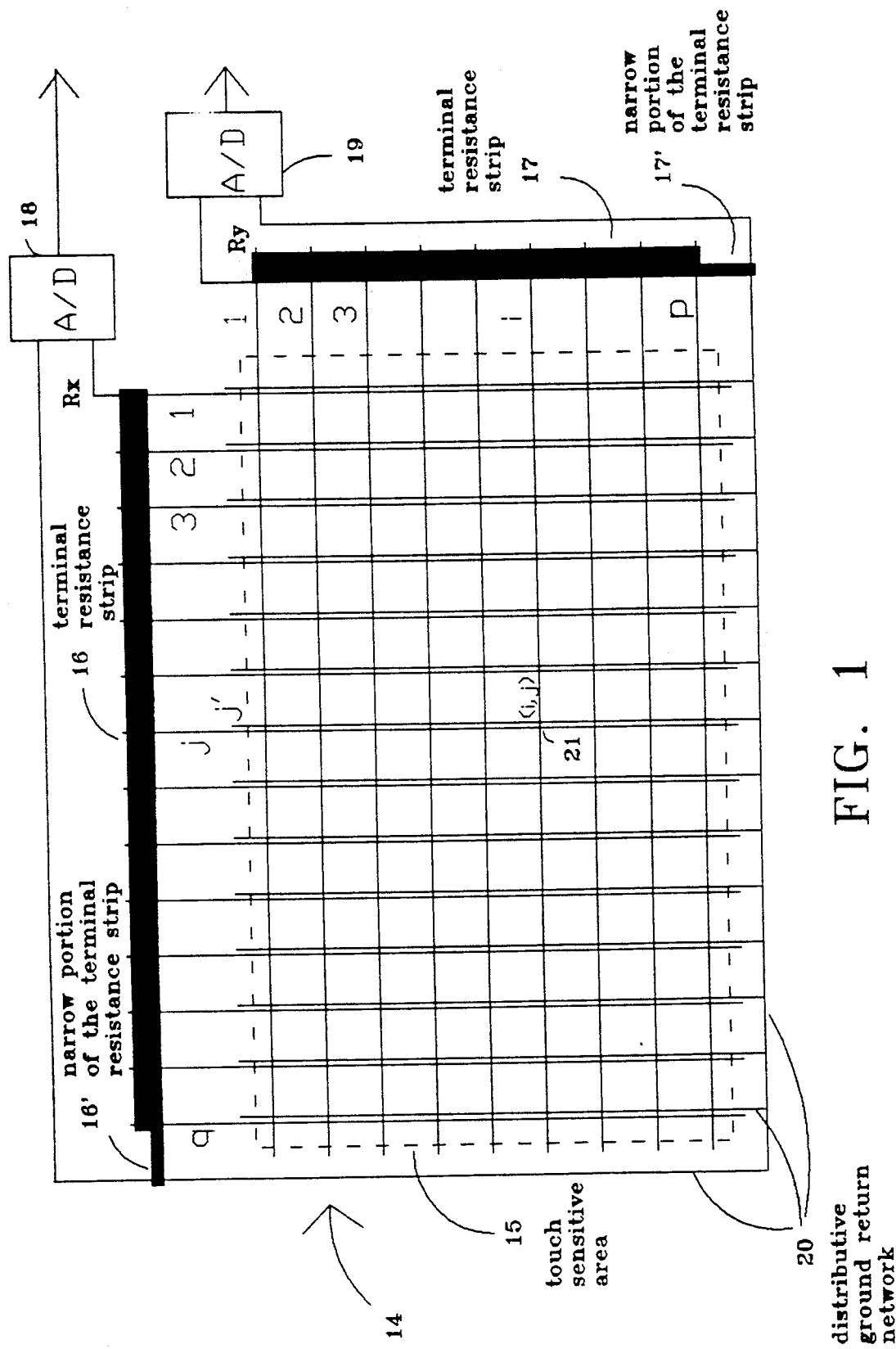
FIG. 1 is a schematic view of a control device, according to the invention as a touch pad or touch screen.

As shown schematically in FIG. 1, the control device 14 includes a touch sensitive area 15 comprising a matrix of $(p \times q)$ discrete switch positions, two terminal resistance Rx 16 and Ry 17, and two A/D (analog-to-digital) converters 18, and 19. The matrix of discrete switch positions is composed of p rows of conductors electrically separated from two sets of q columns of conductors. The two sets of q columns of conductors are interleaved such that the first set is in close proximity of the second set as illustrated by conductors j in the first set and j' in the second set. The terminal resistance Ry 17 is electrically connected across one end of all the row conductors while the terminal resistance Rx 16 is across also one end of the first set of the column conductors. The terminal resistance can be implemented with continuous resistive coating strip as shown in FIG. 1 or as discrete resistors as shown in FIG. 6. One end of the terminal resistance Rx 16 and Ry 17 are electrically connected together and connected to one end of the second set of the column conductors. This complete conductor network which includes the second set of the column conductors thus serves as common or ground return path 20 for every touch position. The terminal resistance Rx 16 and Ry 17 are connected to the A/D converter 18 and 19 respectively. A switch position at row i and column j denoted by (i,j), 21 in the touch sensitive area is therefore made up of the contacts between any one row i with any composite column comprising of two conductors j and j'. When one of these touch positions say (i,j), 21 is touched by a finger or a blunt stylus, a row conductor will be pressed in electrical contact with the two conductors of the specific column. Because of the close proximity of the two conductors, this in effect connects simultaneously the selected row sensing conductor i and column sensing conductor j to the ground path 20 through conductor j'. As the result, the terminal resistance value Rx 16 and Ry 17 are changed proportionally. The close proximity of column sensing conductor j and the ground return conductor j' ensures that when a touch position 21 is touched, these two column conductors j and j' always come in contact with the row conductor i simultaneously, and thus minimizes erroneous or intermittent result. This is especially important in low-resolution large touch pad/screen or touch floor mat where the column and row sensing conductors are spaced far apart to reduce conductive coating or conductive wire cost. It should be pointed out that the spacing between sensing conductors is determined by the desired resolution or by the footprint of the finger while the proximity of the ground conductor to the sensing conductor is only limited by the manufacturing process such as the printing tolerance.

If the resistance or resistor between any two column conductors is Ra and that between any two rows is Rb, then the terminal resistance Rx and Ry when colum j and row i is touched are given by $$Rx = (j-1) * Ra; \text{ for j from 1 to q}$$

$$\text{and } Ry = (i-1) * Rb; \text{ for i from 1 to p}$$

Since for a given implementation Ra, Rb, p and q are known, the touch position (i, j) can be easily computed from the measured terminal resistance Rx and Ry. Therefore, the position sensing and encoding is accomplished by sensing the terminal resistance values and A/D converting them for digital x and y coordinates.

In order to ensure any touched state and the normally untouched state can be detected with certainty, the resistance between the last column sensing conductor q and the common return 20 is made much larger than the resistance between any two adjacent column sensing conductors. This can be implemented by narrowing and/or lengthening that portion of the resistive coating such as illustrated by 16'. Similarly, for the same objective, the resistive coating between the last row sensing conductor p and the common return 20 is narrowed as illustrated by 17'. If these two resistors are r1 and r2 respectively, the normally untouched state terminal resistance Rxo and Ryo are given by $$Rxo = (q-1) * Ra + r1$$

$$\text{and } Ryo = (p-1) * Rb + r2$$

The difference between Rxo and Rx or that between Ryo and Ry for any touched position is at least r1 and r2 respectively. Since r1 and r2 are much larger than Ra and Rb respectively, the normally untouched and the touched state of the last sensing column or row can be easily detected with great certainty. One extreme is that r1 and/or r2 become infinitive resistance. In other words, 16' and 17' become open circuits. This will serve the same purpose also. Normally, the ratio of r1/Ra and that of r2/Rb is about three to five times. This will provide sufficient margin in detection threshold to combat the inexpensive A/D conversion noise.

From the foregoing, it should be appreciated that this invention does not need a separate ground plane or layer in the touch sensitive area, nor does it require complex external connect translator and switches. Therefore, this invention lends itself to very low cost manufacturing for a wide variety of applications with high detection/decoding reliability.

Figure 2:
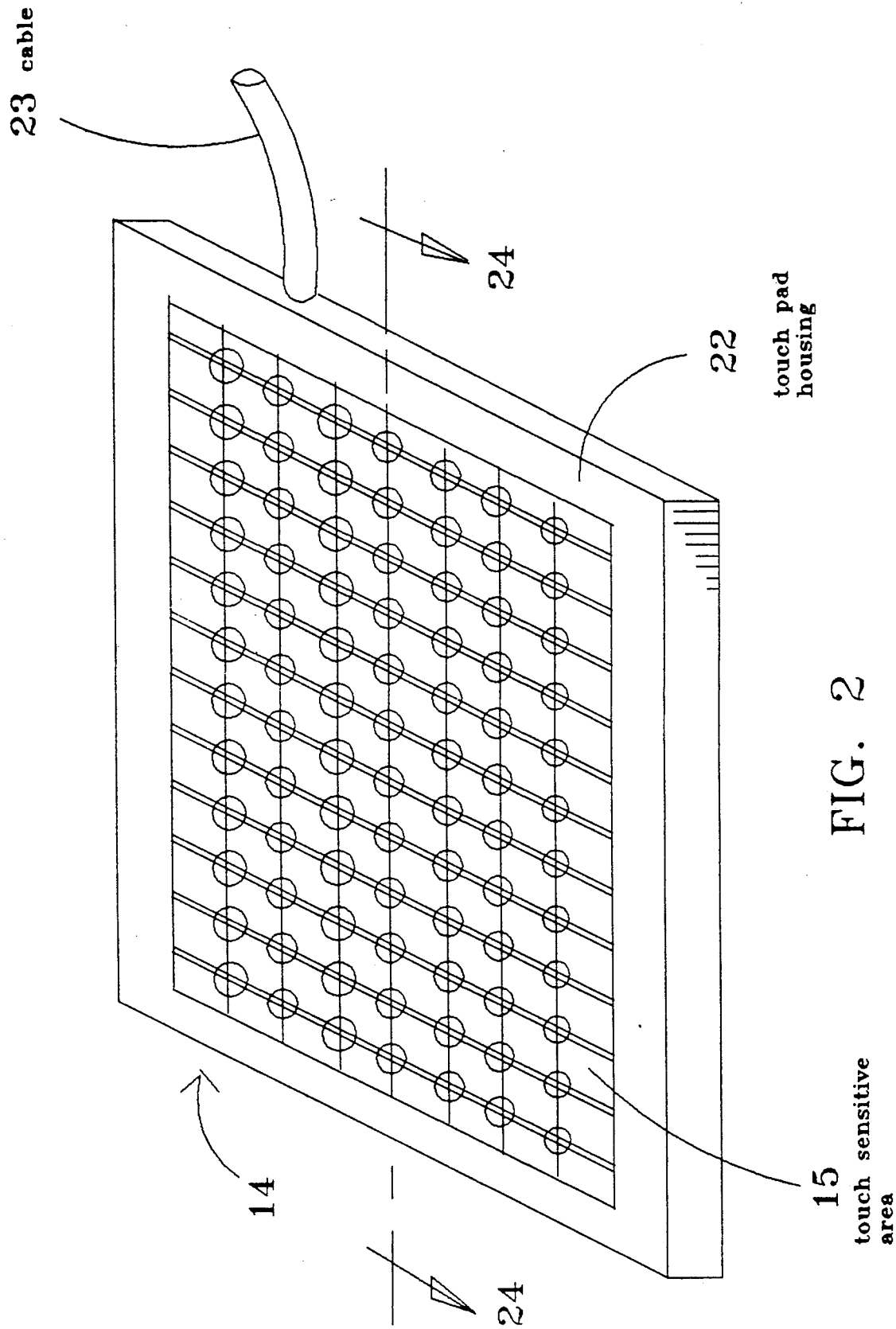
FIG. 2 is a perspective view of the control device shown schematically in FIG. 1 using coated membrane layers.
Figure 3A:
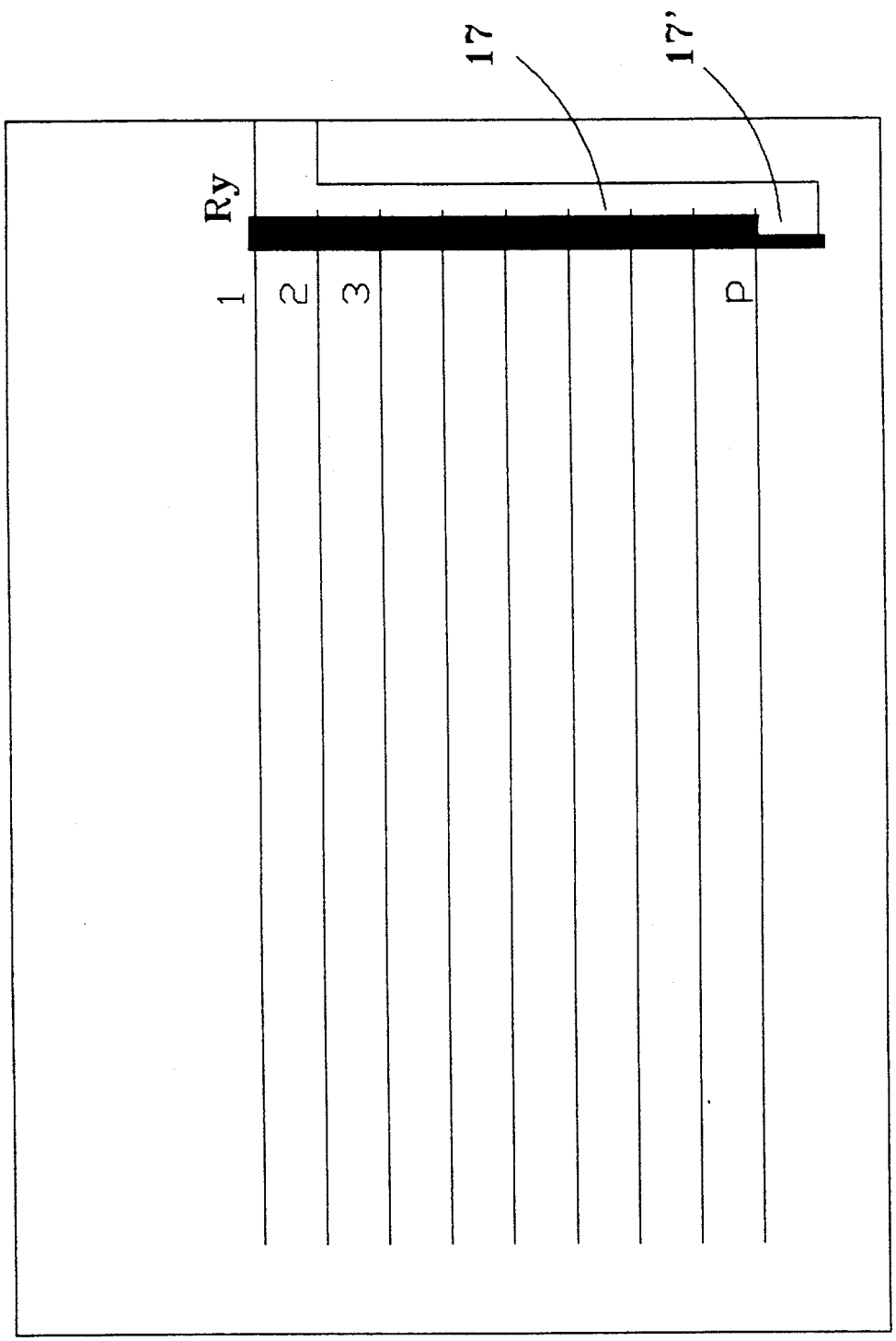
FIG. 3a–3c shows the layers of the control device shown in FIG. 2 with distributed ground coated on the column sensing layer.
Figure 3B:
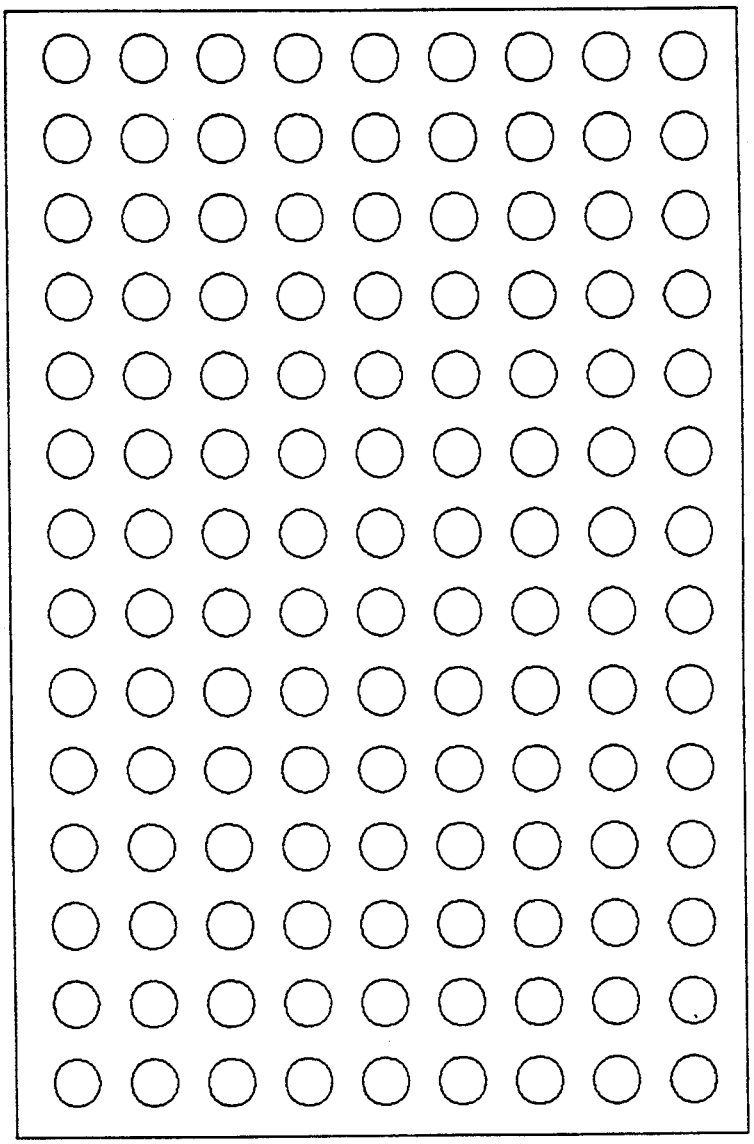
Figure 3C:
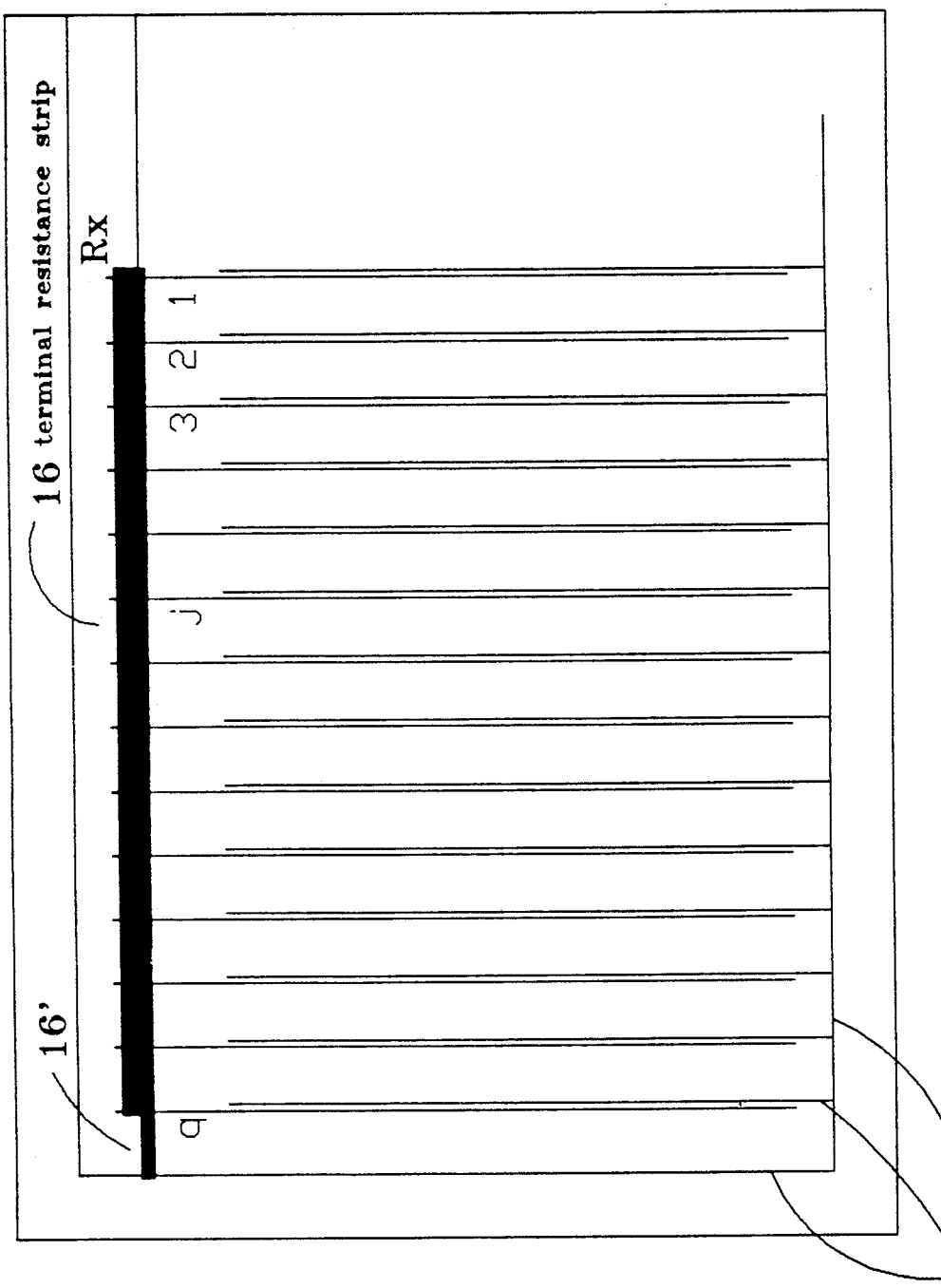
Figure 4:
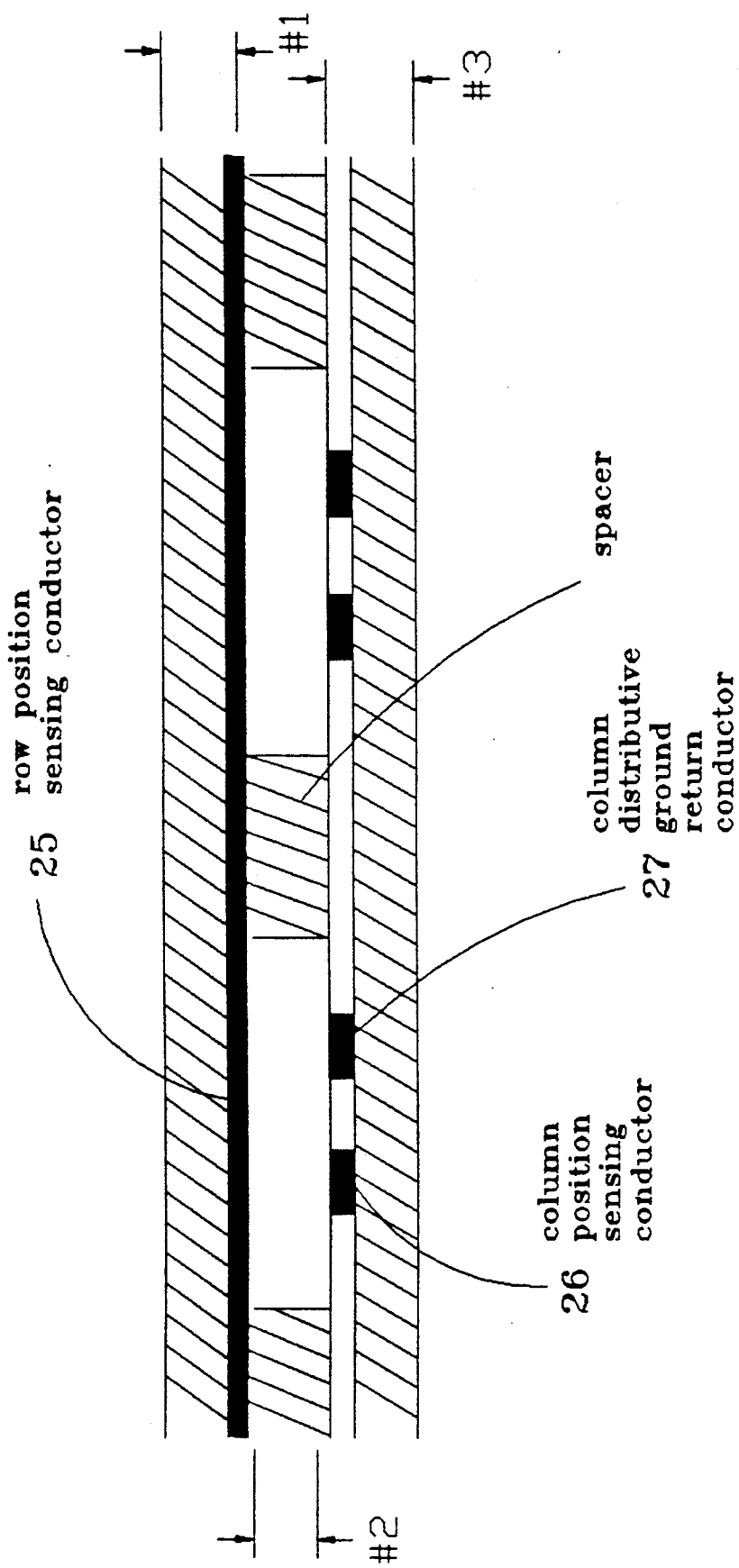
FIG. 4 is a cross-sectional view of the control device shown in FIG. 2, along line 24—24.

For standard touch pad or touch screen size, FIG. 1 is best implemented by membrane switch technology. FIG. 2 shows the perspective view of the control device 14 of FIG. 1 using membrane layers. It comprises of a housing 22, a touch sensitive area 15 made of three membrane layers and a cable 23 interfacing to any host computing machine. The top, the middle, and the bottom layer are shown in FIG. 3a, 3b, and 3c respectively for clarity. The undersurface of the top or first membrane layer (FIG. 3a) is coated with p rows of conductors. A resistive strip, Ry 17 is coated across the ends of the row conductors near one side of the membrane layer. The top surface of the bottom or third membrane layer (FIG. 3c) is coated with the two sets of q columns of conductors and a L-shaped common conductor near the two adjacent sides of the membrane. As pointed out earlier, this L-shaped conductor together with the second set of coloum conductors forms a ground return network 20. Again, a resistive strip, Rx 16 is coated across the ends of the first set of q column conductors and in contact with one end of the the L-shaped ground return conductor. The other end of the L-shaped ground conductor will be in electrical contact with one end of the Ry resistive strip coating of the first layer when these two coated layers are placed on top of one another with a smaller uncoated middle or second membrane layer in-between or they can be wired together outside the membrane layers. This second membrane layer (FIG. 3b) has a matrix of holes corresponding to the matrix of touch positions where the rows cross the columns. Its size is smaller than the other two layers and it covers only the touch sensitive area. This layer serves as a spacer between the two coated layers. There are also conductor leads coated on the first and third membrane layers to connect the terminal resistance Rx, and Ry to the A/D converters not shown in FIG. 2 and 3. A portion of cross-sectional view along line 24—24 of FIG. 2 is shown in FIG. 4. In this cross-sectional view, the row conductor 25 of the top membrane layer #1 will be in electrical contact with the column conductors 26 and 27 of the bottom layer #3 when this touch position is pressed.

A variation to the above embodiment is that the middle spacer layer can be implemented with dielectric isolators at a regular interval and physically printed on one of two surfaces where the sensing conductor are printed resulting a two-layer implementation. It should be noted that the isolator dots can be printed anywhere so long as they are not printed in the intended contact positions. The middle spacer layer can also be just a frame border spacer so that the top and bottom layer is separated by air trapped in between. In addition, it should be noted that the distributed ground can be implemented on the row sensing layer instead of the column sensing layer. FIG. 5a and FIG. 5b shows the top and bottom layers with distributed ground and dielectric spacer isolators printed on the row sensing bottom layer instead of column sensing top layer.

For large area touch control device, FIG. 1 can be implemented with conductor wires and row and column can be separarted by spacers around each touch position and discrete resistors between each row sensing and column sensing wires, etc instead of resisitive coating. Schematically, the touch floor mat apparatus is the same as shown in FIG. 1 except discrete resistors are used instead of resistive coating. FIG. 6 shows the touch control device as a touch floor mat. A set of conductor wires as represented by j interleaved in close proximity with another set as represented by j' are attached to the undersurface of the bottom surface of the column sensing layer. Similarly, a set of row conductor wires as represented by i is attached to the top surface of the row sensing layer. These two layers are separated by spacers at each touch position. When one of these touch position is stepped on, its location can be sensed and decoded the same means as described before in the touch screen/pad operation. The condutor wires can be made attached to the insulating layer by stitches or by adhesives at regular interval.

Another novel means of providing the ground or common return path for every touch position is the concept of mobile ground return structurally incorporated on the tip of the blunt stylus or the protrusion on the underside of the mouse. Schematically, this alternative ground return method is illustrated in FIG. 7. Functionally, this control device 28 is similar to that of FIG. 1 or 2. When the mobile ground implemented as a stylus 29 is pressed against one of the touch positions, the metal tip of the stylus 21 makes direct contact with the row conductor i which in turn makes contact with the column conductor j, and thus shorting the two conductors to ground. This again changes the terminal resistance Rx 16 and Ry 17 enabling the sensing and encoding of the touched position by the A/D converters 18 and 19 or other means. This is a novel implementation of the composite switch in a vertical structure with no fixed ground plane or ground network. The stylus mobile ground in this embodiment activates two switches (row-to-ground and column-to-ground switches) simultaneously. Thus, this enables reliable position entry without complex electronics and separate sequence enter and transfer operation.

Figure 10:
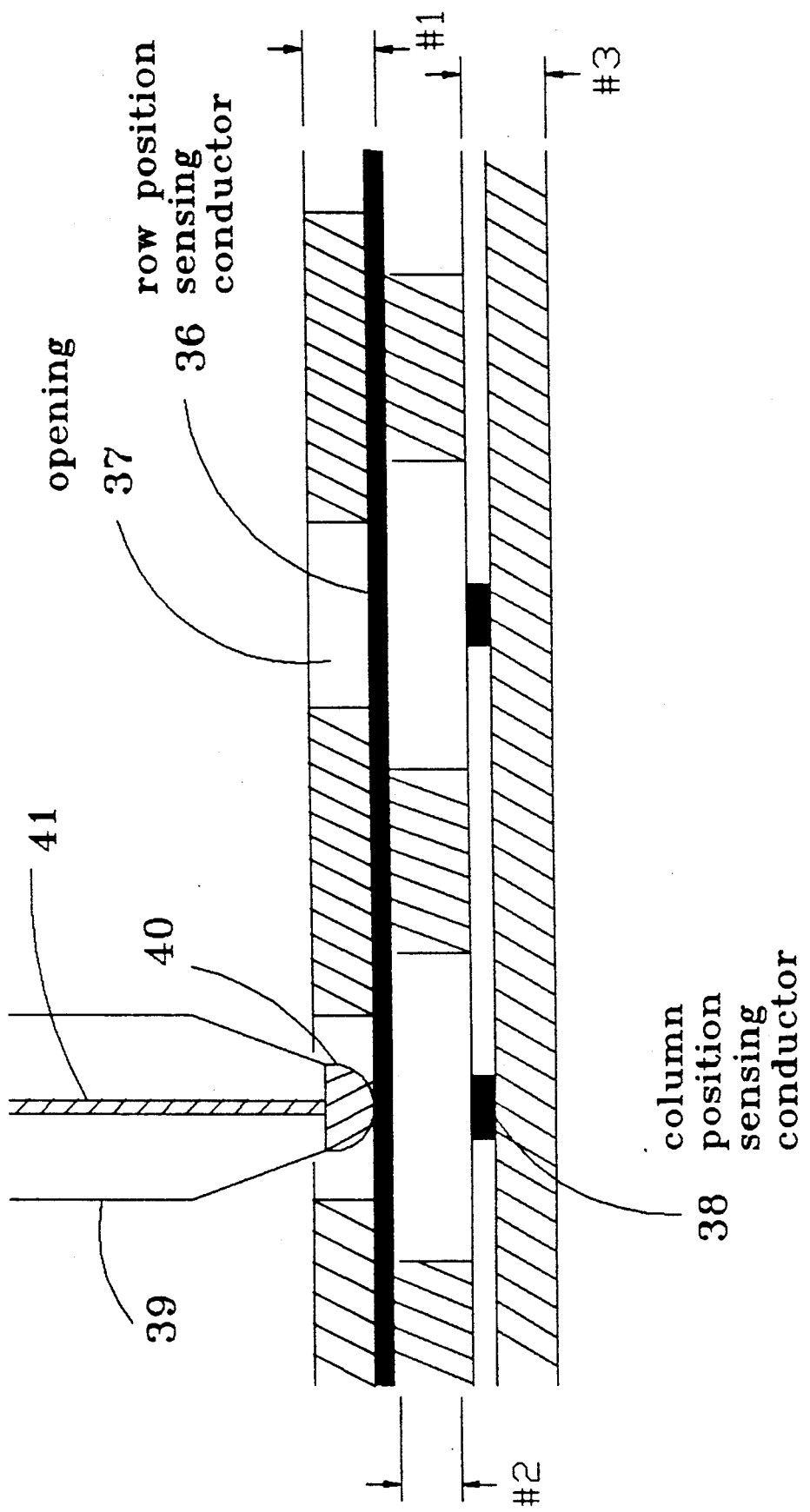
FIG. 10 is a cross-sectional view of the control device shown in FIG. 8, along line 35—35.

There are many variety of ways of implementation for the mobile ground composite switch concept. One way is using discrete wire mesh. Another implementation using insulating layers such as plastic memebrane or paper sheet with adhesive metal strips or wires also leads to low-cost manufacturing. FIG. 8 shows a perspective view of the mobile ground control device 28 using blunt stylus for both pointing as well as providing the ground return. It consists of a housing 30, the touch sensitive area 31, a stylus 32 with the ground return path cable 33, and an interface cable 34 to the host computing machine. The first two layers are geometrically the same as FIG. 4 and FIG. 4 respectively. The third layer has only one set of q column conductors as shown in FIG. 9. A cross-sectional view of FIG. 8 along line 35—35 is shown in FIG. 10. It should be noted that the first layer #1 although geometrically the same as FIG. 4a, it consists a matrix of openings to the row conductors in each touch position for the mobile ground contact. Therefore, FIG. 10 shows the row conductor 36 with opening 37 of layer #1, and the column conductor 38 of the bottom layer #3. When the stylus 39 with metal tip 40 and ground return path 41 is pressed down through the opening 37, the row conductor 36 will come in contact with the column conductor 38 and thus the ground. This changes the terminal resistance values Rx and Ry simultaneously for the x, and y switch position sensing and detection. The same principle holds for a mouse-shape object with a small metal contact underneath instead of stylus mobile ground.

Also, it should be noted that most the A/D converters are available in the host computing machines such as the game ports of the IBM PC, the terminal resistance of the above embodiments can be interfaced to them directly. Because of the noise in these A/D converters, the special feature of having the last resistive ink strip longer and/or narrower makes the decoding process of the normally untouched state and the touched state of the last sensing x and/or y coordinate without any errors at all.

In summary, the key features in making the present invention is that structurally every discrete switch position is in fact composed of two switch contacts in close proximity providing not only the x and y position definition, but also a simple means of simultaneous common signal return either as a distributed ground network on the same layer as the sensing conductors or as a mobile ground on the tip of a stylus leading low-cost reliable touch pad or touch screen implementation. The implementation of this basic concept can take in many forms such as those described earlier.

The foregoing detailed description is illustrative of several embodiment of the invention, and it is to be understood that additional embodiments thereof will be obvious to those skilled in the art. The embodiments described herein together with those additional embodiments are considered to be within the scope of the invention.

What is claimed is:

1. A touch pad or a touch screen comprising:
   a. a first sheet of insulating material with one surface coated with a first plurality of parallel position sensing conductive strips which are connected at one end with a resistive coating strip having a first terminal resistance value except the last position sensing conductor;
   b. a second sheet of insulating material with one surface coated with a second plurality of parallel position sensing conductive strips which are connected at one end with a resistive coating strip having a second terminal resistance value except the last position sensing conductor;
   c. a ground return network of a plurality of parallel conductive strips coated on the same position sensing conductor surface of either the said first sheet or the said second sheet of the insulating material, each strip of said network interleaved with said plurality of position sensing conductive strips such that each conductive strip of said ground return network is in close proximity to an associated position sensing conductive strip;
   d. means for orienting said first sheet of insulating material and said second sheet of insulating material such that the conductive strips of the two sheets are facing each other in orthogonal orientation and such that by pressing a selected point on the oriented sheets, a selected one of said plurality of conductive strips on one sheet come into contact with the interleaved conductive strips of the other sheet, thereby changing the terminal resistance values of said resistive coating strips proportionally to the touched position;
   e. means for connecting said resistive coating strips to analog-to-digital converters to determine the x- and y-digital coordinates of the point of contact; and
   f. means of having the resistance between the last position sensing conductor and the ground return three to five times larger than the resistance between all the other position sensing conductors of said first and second sheet.

2. A touch floor mat comprising:
   a. a first sheet of insulating material with one surface stiched or glued with a first plurality of parallel position sensing conductive wires which are connected at one end with resistors having a first terminal resistance value except the last position sensing conductor;

b. a second sheet of insulating material with one surface stiched or glued with a second plurality of parallel position sensing conductive wires which are connected at one end with resistors having a second terminal resistance value except the last position sensing conductor;

c. a ground return network of a plurality of parallel conductive wires on the same position sensing conductor bearing surface of either the said first sheet or the said second sheet of the insulating material, each wire of said network interleaved with said plurality of position sensing conductive wires such that each conductive wire of said ground return network is in close proximity to an associated position sensing conductive wire;

d. means for orienting said first sheet of insulating material and said second sheet of insulating material such that the conductive wires of the two sheets are facing each other in orthogonal orientation and such that by pressing a selected point on the oriented sheets, a selected one of said plurality of conductive wires on one sheet come into contact with the interleaved conductive wires of the other sheet, thereby changing the terminal resistance values of said resistors proportionally to the touched position;

e. means for connecting said resistors to analog-to-digital converters to determine the x- and y-digital coordinates of the point of contact; and f. means of having the resistor between the last position sensing conductor and the ground return three to five times larger than the resistors between all the other position sensing conductors of said first and second sheet.

3. A stylus-type touch pad comprising:

a. a first sheet of insulating material with one surface coated or glued with a first plurality of parallel position sensing conductive strips which are connected at one end with a resistive coating strip having a first terminal resistance value except the last position sensing conductor;

b. a second sheet of insulating material with one surface coated or glued with a second plurality of parallel position sensing conductive strips which are connected at one end with a resistive coating strip having a second terminal resistance value except the last position sensing conductor;

c. means for providing a mobile ground return for the position sensing conductive strips of the said first and second sheet through the tip of a stylus or mouse contact;

d. means for orienting said first sheet of insulating material and said second sheet of insulating material such that the conductive strips of the two sheets are facing each other in orthogonal orientation and such that by pressing with said stylus or mouse contact on a selected point on the oriented sheets, a selected one of said first plurality of conductive strips comes into direct contact with a selected one of said conductive strips of said second sheet and both in contact with the said ground return tip, thereby changing the terminal resistance values of said resistive coating strips proportionally to the touched position;

e. means for connecting said resistive coating strips to analog-to-digital converters to determine the x-and y-digital coordinates of the point of contact; and f. means of having the resistance between the last sensing conductor and the ground return three to five times larger than the resistance between all the other position sensing conductors of said first and second sheet.

* * * * *